(12) United States Patent
Bieniosek et al.

(10) Patent No.: US 6,372,014 B1
(45) Date of Patent: *Apr. 16, 2002

(54) MAGNESIUM INJECTION AGENT FOR FERROUS METAL

(75) Inventors: Thomas H. Bieniosek, Litchfield; Jerome P. Fahey, Avon, both of OH (US)

(73) Assignee: Rossborough Manufacturing Co. L.P., Avon Lake, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/546,017

(22) Filed: Apr. 10, 2000

(51) Int. Cl.⁷ .................................................. C21B 3/02
(52) U.S. Cl. ............................. 75/315; 75/316; 420/22; 420/23
(58) Field of Search ............................. 420/22, 23, 24; 75/315, 316

(56) References Cited

U.S. PATENT DOCUMENTS

| 2,873,188 A | * | 2/1959 | Bieniosek ..................... 420/23 |
| 3,604,494 A | | 9/1971 | Trager et al. |
| 3,637,373 A | | 1/1972 | Bylund et al. |
| 3,955,973 A | | 5/1976 | Robinson |
| 4,004,630 A | | 1/1977 | Dunks |
| 4,086,086 A | | 4/1978 | Dawson et al. |
| 4,173,466 A | | 11/1979 | Mc Laughlin et al. |
| 4,210,195 A | | 7/1980 | Mc Pherson |
| 4,224,069 A | | 9/1980 | Kessl |
| 4,313,758 A | | 2/1982 | Henning et al. |
| 4,385,030 A | | 5/1983 | Dremann |
| 4,540,436 A | | 9/1985 | Wolfsgruber et al. |
| 4,900,375 A | | 2/1990 | Alt et al. |
| 4,943,317 A | * | 7/1990 | Lischka et al. ................ 75/312 |
| 4,943,411 A | * | 7/1990 | Henych et al. ................ 75/568 |
| 5,259,442 A | | 11/1993 | Clark |

* cited by examiner

Primary Examiner—Melvyn Andrews
(74) Attorney, Agent, or Firm—Vickers, Daniels & Young

(57) ABSTRACT

A treatment agent and method to introduce magnesium into ferrous material. The treatment agent includes a mixture of high melting temperature particles and magnesium particles. The content of high melting temperature particles in the particle mixture is present in an effective amount to inhibit the complete conversion of the magnesium particles into molten magnesium prior to the magnesium particles entering the ferrous material. The method describes the efficient treatment of molten ferrous material with these particles.

43 Claims, 2 Drawing Sheets

MAGNESIUM INJECTION AGENT FOR FERROUS METAL

The present invention relates to a composition of an agent and a method for the treatment of molten ferrous metal, and more particularly to a magnesium-containing agent and method for the treatment of molten ferrous metal.

BACKGROUND OF THE INVENTION

Cast iron is primarily an iron alloy that contains carbon and silicon. Wide variations of the properties of cast iron material can be achieved by varying the amount of carbon and silicon, and by adding various metallic alloys to the cast iron. Commercial cast irons include gray, ductile, malleable, compacted graphite and white cast iron, among others. With the exception of white cast iron, the cast iron steels have a common micro-structure that consists of a graphite phase and a matrix that may be ferritic, pearlitic, bainitic, tempered martensitic, or combinations thereof. Gray iron has flake shaped graphite, ductile iron has nodular or spherically shaped graphite, compacted graphite iron (also called vermicular graphite iron) is intermediate between these two, and malleable iron has irregularly shaped globular graphite that is formed during tempering of white cast iron. White cast irons do not have any graphite in the microstructures, but instead the carbon is present in the form of cementite (iron carbide). Cast irons are also classified as either unalloyed cast irons or alloyed cast irons. Unalloyed cast irons are essentially iron-carbon-silicon alloys with only trace amounts of other elements. Alloyed cast irons are considered to be those casting alloys based upon iron-carbon-silicon systems that contain one or more alloying-elements that are intentionally added to enhance one or more useful properties of the cast iron.

In the production of ductile and compacted graphite cast iron, pure magnesium or alloys having varying amounts of magnesium are added to molten cast iron. The addition of the magnesium to the cast iron improves the strength properties of the cast iron by modifying the graphite matrix in the cast iron. Various techniques can be used to introduce the magnesium into the cast iron. Small particles of pure magnesium can be directly added to the molten cast iron. The magnesium particles can be plunged into a ladle of the molten cast iron. Injection of the magnesium particles through a lance can be used, but this method requires large volumes of transport gas, otherwise the magnesium particles melt prior to being injected into the molten cast iron thus resulting in the plugging of the lance. The large volumes of transport gas can cause severe splashing, rendering the process impractical. The addition of magnesium particles on the surface of the molten cast iron is generally not used since much of the magnesium vaporizes before it can modify the cast iron. Magnesium has a boiling point of about 2025° F. The cast iron in the ladle or melting pot is generally maintained at about 2300–2850° F. As a result, the magnesium rapidly vaporizes on contact with the molten cast iron and vaporizes into a gas without modifying the cast iron. Several methods have been developed to increase the recovery of the magnesium on the cast iron. For example, one method involves magnesium deposited on the bottom of the melting pot or ladle and then being covered with reaction retarding steel plates, whereupon the iron is poured over the magnesium. Other methods require similar cumbersome preparation.

The most common method for producing ductile and compacted graphite cast iron alloys is to add ferrous metal alloys that include magnesium into the molten cast iron. The ferrous metal alloys typically are made of iron, silicon and magnesium so as to not introduce any undesired substances into the cast iron. The ferrous metal alloy is introduced in solid form into the molten cast iron. The ferrous metal alloy slowly melts in the molten cast iron and the magnesium in the ferrous metal alloy is recovered in much higher percentages than compared with adding pure magnesium to the cast iron.

The ferrous metal alloy is commonly made by smelting liquid ferro-silicon alloys in dedicated furnaces and then tapping the liquid ferro-silicon alloys in transport ladles and adding metallic magnesium in the form of large ingots in the liquid bath in an amount sufficient to obtain the desired magnesium content in the ferro-silicon alloy. Another common method used to add magnesium to the ferro-silicon alloy is to add the metallic magnesium in the form of cored wire with the metallic magnesium contained in a rod formed by a steel sheath. In each of these production methods, the liquid bath and the transport ladle must be stirred, by mechanically stirring the bath with the addition, and/or by stirring with inert gas injected through a porous plug within the ladle and/or through a lance submerged into liquid bath. After the desired amount of magnesium is obtained in the ferro-silicon alloy, the liquid ferro-silicon is poured out of the ladle for solidification for further use by the gray iron foundries. Another method used to add magnesium to molten ferro-silicon alloy is the injection of magnesium granules through a refractory lance. Besides delivering the magnesium directly to the bottom of the bath, at the end of the injection lance, the injection method enables the user to add other alloy fines as a blend with the magnesium granules. However, experience with injection of magnesium into molten pig iron in the steel industry has shown that unless large quantities of transport gas are used, magnesium particles injected alone, without any carrier material, will tend to melt inside the lance, thus plugging the transport pipe, resulting in much lost time and expense in the unplugging of the lance. Unfortunately, the carrier materials used for the injection of magnesium into molten pig iron, for example lime and/or calcium carbide, can also introduce unwanted contaminants into certain grades of ferro-silicon alloys.

In view of the present methods for the formation of magnesium-ferro-silicon alloys for the subsequent use in the alloying of cast iron, there is a need for an improved method and additive for the formation of magnesium-ferro-silicon alloys which results in increased amounts of magnesium alloying and which simplifies the alloying process and reduces the costs and wastes associated with the formation of the magnesium-ferro-silicon alloys. Moreover, these treatment agents and methods used for introducing magnesium into the molten ferrous metal, ferro-silicon, can also be applied for the treatment with magnesium of the molten ferrous metal, cast iron, for the production of ductile cast iron.

SUMMARY OF THE PRESENT INVENTION

The present invention overcomes the problem with adding magnesium particles by the injection of magnesium particles alone into the ferro-silicon alloys by using an improved mixture of treatment particles. The present invention also simplifies the alloying process, eliminates the need for adding possible contaminates to the magnesium-ferro-silicon alloy, improves the amount of alloying of the magnesium in the ferro-silicon alloy, and/or reduces the amount of waste associated with the production of the magnesium-ferro-silicon alloy. However, the invention has broader applications in that the treatment particles can be directly added to molten iron to alloy and/or desulfurize the molten iron without the use, or in combination with the use, of a magnesium-ferro-silicon alloy.

In accordance with the principal aspect of the present invention, magnesium particles are injected into a ferro-silicon alloy by a lance to alloy a desired amount of magnesium in the ferro-silicon alloy. The melting of the metallic magnesium in the transport pipe of the lance is inhibited or overcome by mixing the magnesium particles with high melting temperature particles. The high melting temperature particles are designed to absorb heat as the high melting temperature particles and the magnesium particles are transported through the lance and into the ferro-silicon alloy. The absorption of heat by the high melting temperature particles inhibits or prevents the magnesium particles from melting or completely melting prior to being injected into the molten ferro-silicon alloy. By inhibiting the melting of the magnesium particles in the lance, the problems associated with plugging of the lance during the magnesium alloying of the molten ferro-silicon alloy is overcome. In one embodiment, the magnesium particles are made of a majority of magnesium. In one aspect of this embodiment, the magnesium particles are made up of over 90% magnesium, preferably over 95% magnesium, and even more preferably over 98% magnesium. In another embodiment, the high melting temperature alloy particles are made up of two or more of the following metals, namely, aluminum, antimony, beryllium, boron, calcium, chromium, copper, iron, magnesium, manganese, nickel, rare earth metals, silicon, silver, sodium, strontium, tin, titanium, vanadium, zinc, zirconium, and mixtures thereof. In one aspect of this embodiment, the high melting temperature particles include iron and silicon. In another aspect of this embodiment, the high melting temperature particles include iron, magnesium and silicon. The specific composition of the high melting temperature particles is selected to obtain the desired heat absorbing characteristics of the particles when used in combination with the magnesium particles. The specific composition of the high melting temperature particles is also preferably selected to minimize contamination of the molten ferro-silicon alloy. As can be appreciated, if the final composition of the ferrous metal should not include aluminum, the high melting temperature particle should not include aluminum so as not to introduce aluminum into the ferro-silicon alloy which in turn is later added to the molten ferrous metal. In still another embodiment, the high melting temperature particles include iron, silicon and magnesium or iron and silicon to avoid contamination of the molten ferrous material by unwanted elements. The use of magnesium-ferro-silicon alloy or ferro-silicon alloy as the high melting temperature particle simply adds more material of similar composition to the molten ferro-silicon, thus not contaminating the ferro-silicon alloy with undesired elements. Materials commonly used as a carrier for metallic magnesium in other applications, such as hot metal desulfurization, which include lime or calcium carbide, can introduce calcium to the magnesium-ferro-silicon alloy, which is unwanted for certain grades of alloy. The present invention avoids the addition of unwanted elements. However, certain grades of ferro-silicon require a minimum calcium content. For these grades, the use of lime or calcium carbide as the material for the high melting temperature particles would be very appropriate. In this embodiment, magnesium particles and lime and/or calcium carbide particles are injected into the molten ferro-silicon bath, with the aim of recovering both magnesium and calcium from the injected particles.

In accordance with a further embodiment of the invention, the magnesium particles and high melting temperature particles are added to a ferrous alloy. In one aspect of this embodiment, the ferrous alloy is substantially iron. In another aspect of this embodiment, the ferrous alloy is a ferro-silicon alloy. Preferably, the ferro-silicon alloy includes 15–95% silicon and 5–85% iron. In accordance with still a further embodiment of the invention, the magnesium particles are added in a sufficient quantity to the ferrous alloy such that about 0.5–20% magnesium is alloyed in the ferrous alloy.

In accordance with another aspect of the present invention, the ratio of high melting temperature particles to the magnesium particles is selected so as to ensure that the magnesium particles do not sufficiently melt in the lance to cause clogging of the lance during the injection of the magnesium particles and high melting temperature particles into the ferro-silicon alloy. In one embodiment, the amount of magnesium particles in the particle mixture ranges from about 5% to 90% of the mixture, and preferably 60% to 90% of the mixture. The ratio of the metallic magnesium to the high melting temperature particles varies depending on the type of molten alloy, e.g. ferro-silicon alloy, desired and the composition of the high melting temperature particles.

In yet another aspect of the present invention, an injection lance is used to inject magnesium into the molten ferrous alloy (e.g. ferro-silicon alloy) and to improve the alloying of the magnesium in the ferrous alloy. When the magnesium particles are stirred into a liquid bath of the molten ferrous alloy, significant amounts of magnesium are lost by vaporization as fumes and oxidation as white smoke when the magnesium melts in the molten ferrous alloy. The injection of magnesium particles through an injection lance immerses the magnesium particles in the bath to minimize the oxidation of the magnesium and to reduce the vaporization of the magnesium prior to alloying with the ferrous alloy, thus allowing the magnesium to dissolve more completely in the molten ferrous alloy before it reaches the surface of the bath. Furthermore, the reduced loss of magnesium results in increasing economic benefits for the process. The conveying gases of the particles also assist in stirring the particles in the molten ferrous alloy. As a result, the need of a stirring device can be eliminated.

In still another aspect of the present invention, fines which are generated during the casting process of the ferro-silicon, magnesium-ferro-silicon alloy, or the like, can be recycled and used as part of the high melting alloy particles in a subsequent magnesium alloying process. By being able to recycle and remelt these metallic fines from past casting processes, increased recovery of the metallic content of the fines is obtained, resulting in increased economic benefits of the alloying process and less waste. In accordance with still another aspect of the present invention, the composition of the high melting temperature particles is selected to have a melting point which is sufficiently high such that when such particles are combined with the magnesium particles and injected through the lance, the high melting temperature particles absorb a sufficient amount of heat to prevent or inhibit the complete melting of the magnesium particles in the lance. In one embodiment, the average melting temperature of the high melting temperature particles is about 2200° F.

In accordance with still yet another aspect of the present invention, the magnesium particles and the high melting temperature particles are injected into the molten ferrous alloy (i.e. ferro-silicon alloy) as a pre-blended mixture. In one embodiment, the magnesium particles and the high melting temperature particles are at least partially mixed prior to injecting the particles into the lance. In one aspect of this embodiment, the magnesium particles and the high melting temperature particles are substantially mixed prior to injection into the lance. In another embodiment, the magnesium particles and the high melting temperature particles are co-injected into a lance from separate dispensers and the particles are mixed in the lance prior to being conveyed into the molten ferrous alloy. In this aspect of the embodiment, the magnesium particles are blended with at least 10% high melting temperature alloy fines (e.g. ferro-silicon, magnesium-ferro-silicon, etc.) to reduce the chance of inadvertent combustion of the magnesium particles during handling and transport. In another embodiment of the invention, the method of injection through a lance consists of injecting through the single transport line, or from a second set of injectors through a second transport line containing the same lance, i.e. using a dual port lance. Preferably, the particles are fluidized as a suspension of particles in a carrier gas before being injected into the lance. The particle size of the magnesium particles and the high-melting alloy particles is generally the same; however, they can be different. Preferably, the particles are coated with a flow treatment agent such as glycol or a compound of silicon to enhance their fluidization during transport to the lance. The fluidized particles can be carried through the lance by a carrier gas. The carrier gas is preferably inert. The carrier gases commonly used are argon, nitrogen, helium, natural gas, or various other non-oxidizing gases. Preferably, the carrier gas is nitrogen. Generally, the pressure of the carrier gas necessary to inject the particles into the molten ferrous material is about 20–90 psig; however, the pressure may be more or less depending on the particle size of the particles and the depth in which the particles are injected into the molten ferrous alloy. The injection of the magnesium particles into the molten ferrous material not only increases the alloying of the magnesium in the molten ferrous material, the transport gases also increase the mixing of the particles in the molten ferrous alloy to facilitate in the even alloying and distribution of the particles in the molten ferrous alloy.

In accordance with still a further aspect of the present invention, the particles of magnesium and high melting temperature particles can be adapted for use in gray iron foundries. These foundries produce nodular cast iron in a process known as inoculation by introducing magnesium into the cast iron.

An object of the present invention is to provide a new alloy mixture and method of combining the alloying mixture with a molten ferrous material to alloy magnesium with the molten ferrous material.

Another object of the present invention is to provide an alloying mixture which includes a plurality of different particles.

Yet another object of the present invention is to provide an alloying material which includes high melting temperature particles to inhibit or prevent the melting of magnesium particles prior to particles being combined with the molten ferrous material.

In still yet another object of the present invention is to provide an alloying mixture which can be inserted into a molten ferrous material by injection.

A further object of the present invention is to mix magnesium particles with high melting temperature particles prior to injecting the particle mixture into molten ferrous material.

Another object of the present invention is to use a lance or co-injection lance to inject metal alloying particles into molten ferrous material.

In still another object of the present invention is to improve the alloying of magnesium metal in molten ferrous material.

It is still yet another object of the present invention to reduce the loss of magnesium by vaporization or oxidation during the alloying process.

A further object of the present invention is to provide an alloying mixture which can include metal fines from a previous casting process so as to improve metal recovery and/or improve the economics of the process.

These and other objects of the present invention will become apparent to one skilled in the art upon reading the detailed description of the invention in combination with the drawings.

PREFERRED EMBODIMENT OF THE INVENTION

Figure 1:
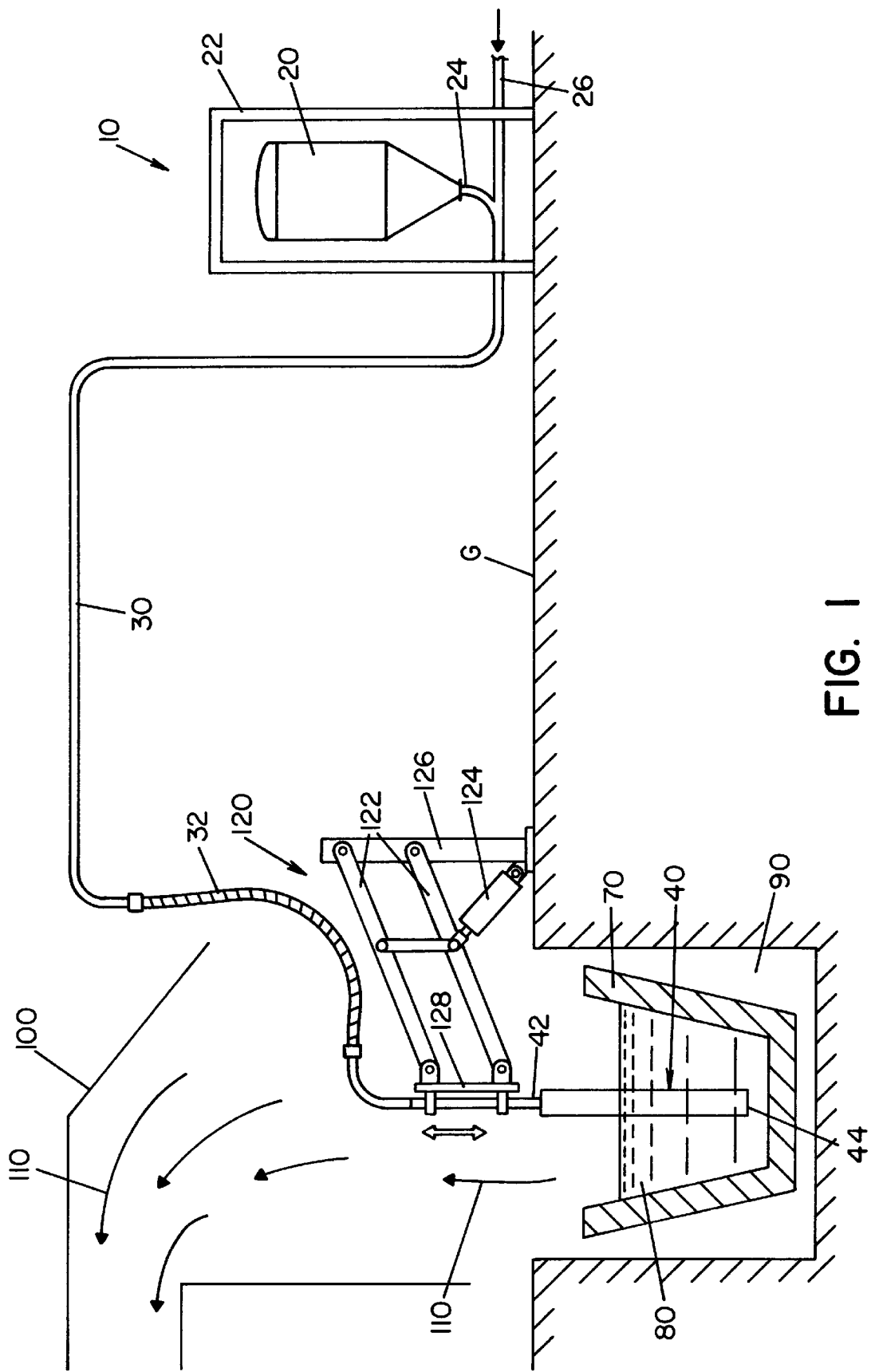
FIG. 1 illustrates an injection process of injecting magnesium particles and high melting temperature alloy particles into molten ferrous material by an injection lance in accordance with the present invention.

Referring now to the drawings where the showings are for the purpose of illustrating a preferred embodiment only and not for the purposes of limiting the same, FIG. 1 illustrates one preferred arrangement for injecting magnesium into a molten bath of ferro-silicon. As shown in FIG. 1 injection assembly 10 includes an injector 20 which is supported by an injector frame 22 and includes an injector port 24 for dispensing particles within injector 20 into an injection pipe 30. The particles in injector 20 are a mixture of magnesium particles and particles of a high melting temperature alloy such as ferro-silicon or magnesium-ferro-silicon. The particle size of the magnesium particles and the particles of high melting temperature alloy are substantially the same with an average particle size of less than about 1.5 mm, and preferably between about 0.18 and 1.5 mm. The ratio of magnesium particles to the high melting temperature particles in injector 20 ranges from about 5:95 to about 90:10. Preferably, the magnesium particles constitute a majority of the mixture, and preferably the content of high melting temperature particles is less than about 40% of the entire mixture. The particles in injector 20 are conveyed from the injector by transport gas such as nitrogen through line 26 and into injector pipe 30. The particles may be fluidized in injector 20 prior to conveyance in injector pipe 30 to facilitate in the transport of the particles in injector pipe 30. As shown in FIG. 1, the particles travel through injector pipe 30 through a flex section 32 and into lance pipe 42 of lance 40. Lance 40 is positioned in ladle pit 90 by a lance handler 120 which is mounted to ground surface G. Lance handler 120 includes a lift pole 126, two lift arms 122 pivotally attached to lift pole 126, a lift piston 124 which elevates lift arms 122 and a lift adaptor mount 128 which secures lance pipe 42 to lift arms 122.

The particles traveling through lance pipe 42 exit the lance end 44 and into molten ferro-silicon 80. The magnesium particles, upon contact with the molten ferro-silicon 80, melt and vaporize in the ferro-silicon and eventually alloy with the ferro-silicon material in ladle 70. The nitrogen carrier gas and some of the vaporized particles which do not alloy with the ferro-silicon alloy 80 bubble up through the surface of ferro-silicon alloy 80 resulting in fumes 110 which are vented from ladle pit 90 through fume hood 100. The bubbling of these gases in the ferro-silicon alloy 80 stirs the alloy to facilitate in magnesium alloying and to make the composition of the ferro-silicon uniform.

Figure 2:
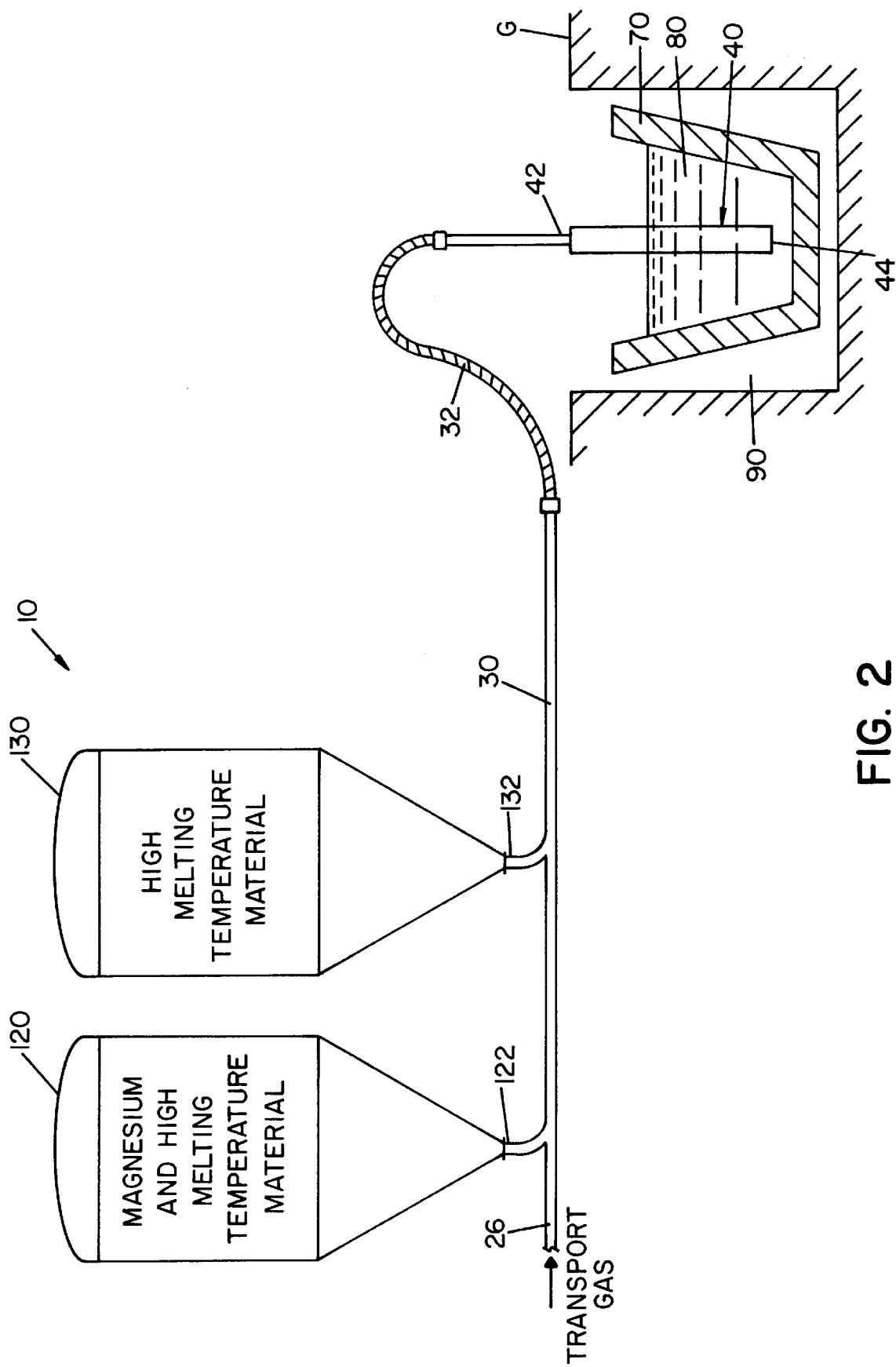
FIG. 2 illustrates a co-injection lance wherein magnesium particles and high-melting alloy particles are mixed in the injection lance prior to being injected into molten ferrous material.

Referring now to FIG. 2, an alternate embodiment of the invention is shown. In FIG. 2, two injectors 120, 130 are used to supply particles to lance 40. Injector 120 includes magnesium particles and high melting temperature particles. The ratio of magnesium particles to high melting temperature particles is about 1.1:1 to 10:1, and preferably 2:1 to 10:1. Injector 130 contains high melting temperature material and little, if any, magnesium. The particles in injectors 120 and 130 can be fluidized prior to conveyance through injector ports 122, 132 and into injector pipe 30. The particles in injector pipe 30 are conveyed to lance 40 by a transport gas which is fed through line 26 into injector pipe 30. During transport in injector pipe 30, the particles from injectors 120, 130 are mixed together. The particles in injector pipe 30 travel through a flex section 32 and into lance pipe 42 of lance 40. The ratio of magnesium particles to the high melting temperature particles passing through lance 40 is about 5:95 to about 90:10. The particles travel through lance 40 and out lance end 44 into molten ferro-silicon 80, which molten ferro-silicon is contained in ladle 70 in ladle pit 90. Preferably, at least 10% of the particles in injector 120 are high melting temperature particles to reduce the chance of inadvertent combustion of the magnesium particles during shipping and handling. Preferably, the conveying gas for each injector is the same.

The composition of the high melting temperature particles is selected so that the melting point of such particles is substantially higher than the melting point of magnesium. In one preferred embodiment, ferro-silicon particles are used as the high melting temperature particles. In another embodiment, magnesium-ferro-silicon particles are used solely or in combination with ferro-silicon particles as the high melting temperature particles. The use of one or both of these types of particles in the alloying process of molten ferro-silicon with magnesium results in not introducing contaminants into the ferro-silicon alloy. In addition, fines from the casting of the magnesium-ferro-silicon alloy can be recycled and later used as the high melting temperature particles for subsequent alloying of magnesium in another batch of ferro-silicon metal. When ferro-silicon particles are used, the composition of such particles is generally about 15 to 95 percent silicon and 5 to 85 percent iron. When magnesium-ferro-silicon particles are used, generally the composition is 0.05 to 20% magnesium, 15 to 95% silicon, and 5 to 85% iron. When additional metal alloys are to be included in the ferro-silicon alloy composition, these alloys can be included with the high melting temperature particles and/or alloyed with such high melting temperature particles.

The composition of the magnesium particles is selected so that the magnesium particles contain a very high percentage of magnesium. The magnesium content of the magnesium particles is at least 90 percent magnesium, preferably 95 percent magnesium, and more preferably 98 percent magnesium.

The particle sizes of the magnesium particles and the high melting temperature particles are selected so that proper and easy conveyance of the particles to the molten ferro-silicon metal is achieved. Metallic particle sizes that are too small can create material handling safety hazards.

Particle sizes that are too large are difficult to fluidize and/or can cause problems during conveyance such as becoming plugged within the injection pipe. Preferably, the average particle size of the magnesium particles and the high melting temperature ferro-silicon or magnesium-ferro-silicon particles is less than about 1.5 mm, and preferably between about 0.18 and 1.5 mm.

The melting temperature of the high melting temperature particles is selected so as to absorb a sufficient amount of heat as the particles are traveling through lance 40 so as to inhibit or prevent the magnesium particles from melting while inside the lance. This heat absorption effect of the high melting alloy particles overcomes the problems with past injection processes using magnesium particles in that the absorption of the heat by the high melting alloy particles inhibits the magnesium particles from melting thus reducing and/or substantially eliminating the clogging of the lance caused by molten magnesium particles. The high melting temperature particles are formulated so that the melting temperature of these particles is substantially higher than the magnesium particles. Preferably, the high melting alloy particles have an average melting temperature of at least about 2200° F. In addition to selecting high melting metal temperature particles to inhibit the melting of the magnesium particles, sufficient quantities of high melting temperature particles are combined with the magnesium particles so that a sufficient amount of heat is absorbed by the high melting temperature metal particles. At least ten weight percent of the particle mixture that is added to the ferro-silicon alloy 70 is high melting temperature particles.

A general formulation of the magnesium-ferro-silicon after ferro-silicon is injected with the particle mixture includes (weight percent):

| Iron | 5–85 |
| Magnesium | 0.05–20 |
| Silicon | 15–95 |

A composition of the cast iron after the magnesium-ferro-silicon alloy is added to molten iron includes (weight percent):

| Iron | 80–98 |
| Aluminum | 0–0.2 |
| Carbon | 1.8–4 |
| Chromium | 0–5 |
| Copper | 0–3 |
| Magnesium | 0.02–0.1 |
| Manganese | 0.2–2 |
| Molybdenum | 0–1 |
| Nickel | 0–20 |
| Silicon | 0.8–17 |

As can be appreciated, the process of alloying molten ferro-silicon can be used to also alloy and/or desulfurize cast iron or other ferrous materials.

A non-oxidizing shielding gas can be used to protect the top of the ferro-silicon molten alloy during the alloying with the particles. Shielding gasses such as argon, nitrogen, helium, and/or natural gas can be used. The shielded environment primarily prevents oxygen from interacting with the molten ferro-silicon alloy to reduce the amount of slag being formed and reduce or prevent combustion of fumes escaping the surface of the ferro-silicon alloy.

The invention has been described with reference to a preferred embodiment and alternates thereof It is believed that many modifications and alterations to the embodiments disclosed will readily suggest themselves to those skilled in the art upon reading and understanding the detailed description of the invention. It is intended to include all such modifications and alterations in so far as they come within the scope of the present invention.

We claim:

1. A treatment agent for a molten ferrous material comprising a mixture of high melting temperature particles and magnesium particles, said high melting temperature particles including metal particles that include at least two metals selected from the group consisting of aluminum, antimony, beryllium, boron, calcium, chromium, copper, iron, magnesium, manganese, nickel, rare earth metals, silicon, silver, sodium, strontium, tin, titanium, vanadium, zinc, zirconium, and mixtures thereof, said high melting temperature particles content of said mixture present in an effective amount to inhibit the conversion of said magnesium particles into molten magnesium prior to said magnesium particles entering said molten ferrous material, the ratio of said high melting temperature particles to said magnesium particles is about 10:90 to 95:5.

2. The treatment agent as defined in claim 1, wherein said high melting temperature particles include Mg—Fe—Si, Fe—Si, and mixtures thereof.

3. The treatment agent as defined in claim 1, wherein said high melting temperature particles include calcium carbide, lime and mixtures thereof.

4. The treatment agent as defined in claim 2, wherein said high melting temperature particles include calcium carbide, lime and mixtures thereof.

5. The treatment agent as defined in claim 1, wherein the ratio of said high melting alloy particles include particles to said magnesium particles is about 10:90 to 40:60.

6. The treatment agent as defined in claim 4, wherein the ratio of said high melting temperature particles to said magnesium particles is about 10:90 to 40:60.

7. The treatment agent as defined in claim 3, wherein the ratio of said high melting temperature particles to said magnesium particles is about 10:90 to 40:60.

8. The treatment agent as defined in claim 1, wherein said magnesium particles include substantially pure magnesium.

9. The treatment agent as defined in claim 2, wherein said magnesium particles include substantially pure magnesium.

10. The treatment agent as defined in claim 7, wherein said magnesium particles include substantially pure magnesium.

11. The treatment agent as defined in claim 6, wherein said magnesium particles include substantially pure magnesium.

12. The treatment agent as defined in claim 5, wherein said magnesium particles include substantially pure magnesium.

13. The treatment agent as defined in claim 1, wherein said magnesium particles have an average particle size of less than about 1.5 mm.

14. The treatment agent as defined in claim 10, wherein said magnesium particles have an average particle size of less than about 1.5 mm.

15. The treatment agent as defined in claim 1, wherein said high melting temperature particles have an average particle size of less than about 1.5 mm.

16. The treatment agent as defined in claim 14, wherein said high melting temperature particles have an average particle size of less than about 1.5 mm.

17. The treatment agent as defined in claim 13, wherein said magnesium particles have an average particle size of about 0.18 to 1.5 mm.

18. The treatment agent as defined in claim 16, wherein said magnesium particles have an average particle size of about 0.18 to 1.5 mm.

19. The treatment agent as defined in claim 15, wherein said high melting temperature particles have an average particle size of about 0.18 to 1.5 mm.

20. The treatment agent as defined in claim 18, wherein said high melting temperature particles have an average particle size of about 0.18 to 1.5 mm.

21. The treatment agent as defined in claim 1, wherein said high melting temperature particles have an average melting point greater than about 2200° F.

22. The treatment agent as defined in claim 9, wherein said high melting temperature particles have an average melting point greater than about 2200° F.

23. The treatment agent as defined in claim 20, wherein said high melting temperature particles have an average melting point greater than about 2200° F.

24. The treatment agent as defined in claim 1, wherein said high melting temperature particles include a metal alloy having a composition including:

| Iron | 5–85% |
|---|---|
| Magnesium | 0–20% |
| Silicon | 15–95% |

25. The treatment agent as defined in claim 12, wherein said high melting temperature particles include a metal alloy having a composition including:

| Iron | 5–85% |
|---|---|
| Magnesium | 0–20% |
| Silicon | 15–95% |

26. The treatment agent as defined in claim 22, wherein said high melting temperature particles include a metal alloy having a composition including:

| Iron | 5–85% |
|---|---|
| Magnesium | 0–20% |
| Silicon | 15–95% |

27. The treatment agent as defined in claim 23, wherein said high melting temperature particles include a metal alloy having a composition including:

| Iron | 5–85% |
|---|---|
| Magnesium | 0–20% |
| Silicon | 15–95% |

28. The treatment agent as defined in claim 1, wherein said high melting temperature particles are a ferro-silicon alloy.

29. The treatment agent as defined in claim 25, wherein said high melting temperature particles are a ferro-silicon alloy.

30. The treatment agent as defined in claim 26, wherein said high melting temperature particles are a ferro-silicon alloy.

31. The treatment agent as defined in claim 27, wherein said high melting temperature particles are a ferro-silicon alloy.

32. The treatment agent as defined in claim 11, wherein said magnesium particles have an average particle size of less than about 1.5 mm.

33. The treatment agent as defined in claim 32, wherein said high melting temperature particles have an average particle size of less than about 1.5 mm.

34. The treatment agent as defined in claim 33, wherein said magnesium particles have an average particle size of about 0.18 to 1.5 mm.

35. The treatment agent as defined in claim 34, wherein said high melting temperature particles have an average particle size of about 0.18 to 1.5 mm.

36. The treatment agent as defined in claim 35, wherein said high melting temperature particles have an average melting point greater than about 2200° F.

37. The treatment agent as defined in claim 36, wherein said high melting temperature particles include a metal alloy having a composition including:

| | |
|---|---|
| Iron | 5–85% |
| Magnesium | 0–20% |
| Silicon | 15–95% |

38. The treatment agent as defined in claim 37, wherein said high melting temperature particles are a ferro-silicon alloy.

39. The treatment agent as defined in claim 24, wherein said high melting temperature particles include a metal alloy having a composition including:

| | |
|---|---|
| Iron | 5–85% |
| Magnesium | 0.05–20% |
| Silicon | 15–95% |

40. The treatment agent as defined in claim 25, wherein said high melting temperature particles include a metal alloy having a composition including:

| | |
|---|---|
| Iron | 5–85% |
| Magnesium | 0.05–20% |
| Silicon | 15–95% |

41. The treatment agent as defined in claim 26, wherein said high melting temperature particles include a metal alloy having a composition including:

| | |
|---|---|
| Iron | 5–85% |
| Magnesium | 0.05–20% |
| Silicon | 15–95% |

42. The treatment agent as defined in claim 27, wherein said high melting temperature particles include a metal alloy having a composition including:

| | |
|---|---|
| Iron | 5–85% |
| Magnesium | 0.05–20% |
| Silicon | 15–95% |

43. The treatment agent as defined in claim 36, wherein said high melting temperature particles include a metal alloy having a composition including:

| | |
|---|---|
| Iron | 5–85% |
| Magnesium | 0.05–20% |
| Silicon | 15–95% |

* * * * *